US008006750B2

(12) United States Patent  
Cesaroni

(10) Patent No.: US 8,006,750 B2
(45) Date of Patent: Aug. 30, 2011

(54) METHOD FOR SEALING HEAT EXCHANGER TUBES

(76) Inventor: Anthony Joseph Cesaroni, Sarasota, FL (US)

( * ) Notice: Subject to any disclaimer, the term of this patent is extended or adjusted under 35 U.S.C. 154(b) by 232 days.

(21) Appl. No.: 11/371,138

(22) Filed: Mar. 8, 2006

(65) Prior Publication Data

US 2006/0242831 A1   Nov. 2, 2006

Related U.S. Application Data

(60) Provisional application No. 60/659,070, filed on Mar. 8, 2005.

(51) Int. Cl.
 *B23P 15/26* (2006.01)
 *F28F 9/18* (2006.01)
(52) U.S. Cl. .................... 165/178; 29/890.054
(58) Field of Classification Search .............. 165/133, 165/134.1, 158, 173, 178; 228/183; 29/890.043, 29/890.052, 890.054; 219/121.37, 121.38, 219/121.45, 121.47
See application file for complete search history.

(56) References Cited

U.S. PATENT DOCUMENTS

| | | | |
|---|---|---|---|
| 1,413,302 A | 4/1922 | Todd | |
| 2,044,457 A | 6/1936 | Young | |
| 2,914,346 A * | 11/1959 | Ryder | 165/178 |
| 2,966,340 A * | 12/1960 | Chapman | 165/134.1 |
| 3,257,710 A * | 6/1966 | Brown et. al. | 29/890.038 |
| 3,540,529 A * | 11/1970 | Umino et. al. | 165/134.1 |
| 3,561,524 A | 2/1971 | Satterthwaite | |
| 3,769,117 A | 10/1973 | Bowen et al. | |
| 3,841,938 A | 10/1974 | Grosse-Holling et al. | |
| 3,991,013 A | 11/1976 | Pletcher | |
| 3,991,014 A | 11/1976 | Kleinschuster | |
| 4,011,199 A | 3/1977 | McFarlane et al. | |
| 4,040,476 A | 8/1977 | Telle et al. | |
| 4,048,148 A | 9/1977 | Morgan | |
| 4,075,262 A | 2/1978 | Schaefgen | |
| 4,083,829 A | 4/1978 | Calundann et al. | |
| 4,118,372 A | 10/1978 | Schaefgen | |
| 4,122,070 A | 10/1978 | Morgan | |
| 4,130,545 A | 12/1978 | Calundann | |
| 4,153,779 A | 5/1979 | Jackson, Jr. et al. | |
| 4,159,365 A | 6/1979 | Payet | |
| 4,161,470 A | 7/1979 | Calundann | |
| 4,169,933 A | 10/1979 | Jackson, Jr. et al. | |
| 4,184,996 A | 1/1980 | Calundann | |
| 4,189,549 A | 2/1980 | Matsunaga et al. | |
| 4,219,461 A | 8/1980 | Calundann | |
| 4,224,096 A | 9/1980 | Osborne | |
| 4,232,143 A | 11/1980 | Irwin | |
| 4,232,144 A | 11/1980 | Irwin | |
| 4,245,082 A | 1/1981 | Irwin | |
| 4,256,624 A | 3/1981 | Calundann | |
| 4,269,965 A | 5/1981 | Irwin | |
| 4,272,625 A | 6/1981 | McIntyre et al. | |

(Continued)

FOREIGN PATENT DOCUMENTS

EP    0086268    8/1983

(Continued)

*Primary Examiner* — Teresa J Walberg
(74) *Attorney, Agent, or Firm* — Boyle Fredrickson, S.C.

(57) ABSTRACT

The present invention comprises a heat exchanger and method for sealing a heat exchanger tube to a header of the heat exchanger. The method comprises melt-bonding the tube to a header of the heat exchanger to form a bond and sealing the bond with a sealant material to form a seal.

24 Claims, 4 Drawing Sheets

U.S. PATENT DOCUMENTS

| | | | |
|---|---|---|---|
| 4,370,466 A | 1/1983 | Siemionko | |
| 4,383,105 A | 5/1983 | Irwin | |
| 4,447,592 A | 5/1984 | Harris, Jr. | |
| 4,522,974 A | 6/1985 | Calundann et al. | |
| 4,529,034 A * | 7/1985 | Saperstein | 165/134.1 |
| 4,597,436 A | 7/1986 | Hagemeister et al. | |
| 4,617,369 A | 10/1986 | Huynh-Ba | |
| 4,664,972 A | 5/1987 | Connolly | |
| 4,684,712 A | 8/1987 | Ueno et al. | |
| 4,727,129 A | 2/1988 | Hisgen et al. | |
| 4,727,131 A | 2/1988 | Kock et al. | |
| 4,728,714 A | 3/1988 | Hisgen et al. | |
| 4,744,505 A | 5/1988 | Calleson | |
| 4,749,769 A | 6/1988 | Kock et al. | |
| 4,762,907 A | 8/1988 | Kock | |
| 4,770,341 A | 9/1988 | Drake | |
| 4,778,927 A | 10/1988 | Kock | |
| 4,790,372 A | 12/1988 | Gemeinhardt et al. | |
| 4,813,112 A | 3/1989 | Pilliez | |
| 4,815,535 A | 3/1989 | Hagemeister | |
| 4,816,555 A | 3/1989 | Hisgen et al. | |
| 4,834,930 A | 5/1989 | Gemeinhardt | |
| 4,849,499 A | 7/1989 | Fagerburg et al. | |
| 4,851,496 A | 7/1989 | Poll et al. | |
| 4,851,497 A | 7/1989 | Wakui et al. | |
| 4,853,514 A * | 8/1989 | Lemelson | 219/121.12 |
| 4,857,626 A | 8/1989 | Kishiro et al. | |
| 4,858,686 A | 8/1989 | Calleson | |
| 4,864,013 A | 9/1989 | Kageyama et al. | |
| 4,868,278 A | 9/1989 | MacDonald et al. | |
| 4,882,410 A | 11/1989 | Neugebauer et al. | |
| 4,896,410 A | 1/1990 | Spitzmesser et al. | |
| 4,923,004 A | 5/1990 | Fletcher et al. | |
| 4,923,947 A | 5/1990 | Coassolo et al. | |
| 4,935,462 A | 6/1990 | Cesaroni | |
| 4,990,206 A | 2/1991 | Garske et al. | |
| 4,999,416 A | 3/1991 | Kaminade et al. | |
| 5,015,721 A | 5/1991 | Gabrielli et al. | |
| 5,015,722 A | 5/1991 | Charbonneau et al. | |
| 5,025,082 A | 6/1991 | Kishiro et al. | |
| 5,086,158 A | 2/1992 | Hayashi et al. | |
| 5,102,935 A | 4/1992 | Heinz et al. | |
| 5,110,896 A | 5/1992 | Waggoner et al. | |
| 5,143,956 A | 9/1992 | Pielartzik et al. | |
| 5,469,915 A | 11/1995 | Cesaroni | |
| 5,499,676 A | 3/1996 | Cesaroni | |
| 5,501,759 A | 3/1996 | Forman | |
| 5,775,318 A | 7/1998 | Haydock et al. | |
| 5,832,991 A | 11/1998 | Cesaroni | |
| 6,149,422 A | 11/2000 | Cesaroni | |
| 6,269,871 B1 | 8/2001 | Nishio et al. | |
| 6,691,774 B2 | 2/2004 | Fletcher | |
| 6,719,037 B2 | 4/2004 | Crook | |
| 2002/0144808 A1 * | 10/2002 | Jones | 165/173 |
| 2003/0029040 A1 | 2/2003 | Cesaroni et al. | |

FOREIGN PATENT DOCUMENTS

| | | |
|---|---|---|
| EP | 0356226 | 2/1990 |
| EP | 0291322 | 11/1991 |
| EP | 0287271 | 6/1993 |
| EP | 0572187 | 2/1998 |
| EP | 0673496 | 6/1998 |
| EP | 0870160 | 2/2001 |
| EP | 1159575 | 1/2005 |
| GB | 1107843 | 3/1968 |
| GB | 1261905 | 1/1972 |
| GB | 2203528 | 10/1988 |
| JP | 57033796 | 2/1982 |
| JP | 59056093 | 3/1984 |
| JP | 59086895 | 5/1984 |
| JP | 61029698 | 2/1986 |
| JP | 07055387 | 3/1995 |
| WO | WO-91/02209 | 2/1991 |
| WO | WO-95/29785 | 11/1995 |

* cited by examiner

METHOD FOR SEALING HEAT EXCHANGER TUBES

CROSS-REFERENCE TO RELATED APPLICATIONS

This application claims priority from U.S. Provisional Patent Application Ser. No. 60/659,070, filed on Mar. 8, 2005, the entity of which is expressly incorporated by reference herein in its entirety.

FIELD OF THE INVENTION

The present invention relates to heat exchangers, in particular, a method for sealing heat exchanger tubes.

BACKGROUND OF THE INVENTION

Heat exchangers are typically used in vehicles for transferring surplus heat from power train coolants and lubricants to the ambient air, and controlling the temperature of ambient air admitted to passenger or freight compartments of vehicles.

Thermoplastic polyamides, including nylon 6, nylon 6,6 and various high temperature nylons have been used to make heat exchangers. Often, panels have been shaped and pressed or adhered together to make tube panels, forming channels through which a heat exchange fluid can pass. However, it has been discovered that such tube panels are more likely to leak than assemblies of tubes themselves. However, assembling multiple tubes and sealing them into tube panels has been a labor intensive effort. More efficient and reliable methods of preparing tube sheet of thermoplastic polymers are desirable.

U.S. Pat. No. 5,469,915 to Cesaroni is directed to a tube panel heat exchanger; U.S. Pat. No. 5,501,759 to Forman is directed to the use of lasers to weld a collar around a single catheter tube, including optional use of a fiber optic around the tube; U.S. Pat. No. 4,744,505 to Calleson is directed to a method of assembling tubes in a header of a heat exchanger; U.S. Pat. No. 4,224,096 to Osborne is directed to splitting a single laser beam and applying two parts of the beam to opposite sides of a plastic article for welding; and U.S. Pat. No. 3,769,117 to Bowen et al. is directed to laser welding of plastic tubes. Moreover, U.S. Patent Application 2003029040 to Cesaroni is directed to laser bonding of heat exchanger tubes and International Patent Application WO 95/29785 to Dalzell and Jahsen is directed to laser powder injection welding of tubes to each other to close gaps between adjacent tubes. Each of these patents and patent applications can be referred to for understanding the state of the art and are each incorporated herein by reference.

SUMMARY OF THE INVENTION

In accordance with one aspect, there is provided a method for substantially sealing a heat exchanger tube to a header of the heat exchanger, the method comprising melt-bonding the tube to a header of the heat exchanger to form a bond and sealing the bond with a sealant material to form a seal.

In accordance with another aspect, there is provided a method for substantially sealing a heat exchanger tube to a header of the heat exchanger, the method comprising melt-bonding the tube to a header of the heat exchanger to form a bond and coating the bond with a sealant material to form a seal.

In accordance with a further aspect, there is provided a method for substantially sealing a heat exchanger tube to a header of the heat exchanger, the method comprising applying a sealant material to a header of the heat exchanger and melt-bonding the tube to the header of the heat exchanger to form a bond and seal.

In accordance with yet another aspect, there is provided a method for substantially sealing a heat exchanger tube to a header of the heat exchanger, the method comprising melt-bonding the tube to the header of the heat exchanger to form a bond and, simultaneously, sealing the bond with a sealant material to form a seal.

In another aspect, the method further comprises the use of an inert gas to inhibit oxidation of the sealant material.

In accordance with another aspect, there is provided a method for sealing a heat exchanger, the heat exchanger comprising a plurality of tubes and a pair of headers, each header having a plurality of holes, an outer side and an inner side, the inner side of one header facing the inner side of the other header, each hole of each header having a collar protruding from the outer side of each header, each collar being adapted to surround the tubes as each tube protrudes through a respective hole, the method comprising melt-bonding each tube to a respective collar of each header of the heat exchanger to form a bond for each tube and sealing each bond with a sealant material to form a seal.

In accordance with another aspect, there is provided a method for substantially sealing a heat exchanger, the heat exchanger comprising a plurality of tubes and a pair of headers, each header having a plurality of holes, an outer side and an inner side, the inner side of one header facing the inner side of the other header, each hole of each header having a collar protruding from the outer side of each header, each collar being adapted to surround the tubes as each tube protrudes through a respective hole, the method comprising melt-bonding each tube to a respective collar of each header of the heat exchanger to form a bond for each tube and coating each bond with a sealant material to form a seal.

In accordance with yet another aspect, there is provided a method for substantially sealing a heat exchanger, the heat exchanger comprising a plurality of tubes and a pair of headers, each header having a plurality of holes, an outer side and an inner side, the inner side of one header facing the inner side of the other header, each hole of each header having a collar protruding from the outer side of each header, each collar being adapted to surround the tubes as each tube protrudes through a respective hole, the method comprising applying a sealant material to the header and melt-bonding each tube to a respective collar of each header of the heat exchanger to form a bond and seal for each tube.

In accordance with a further aspect, there is provided a method for substantially sealing a heat exchanger, the heat exchanger comprising a plurality of tubes and a pair of headers, each header having a plurality of holes, an outer side and an inner side, the inner side of one header facing the inner side of the other header, each hole of each header having a collar protruding from the outer side of each header, each collar being adapted to surround the tubes as each tube protrudes through a respective hole, the method comprising melt-bonding each tube to a respective collar of one header of the heat exchanger to form a bond for each tube and, simultaneously, sealing the bond with a sealant material to form a seal. In another aspect, the melt-bonding comprises melt-bonding each tube to the respective collar of one header of the heat exchanger to form the bond and, simultaneously, sealing the bond with the sealant material to form the seal and melt-bonding each tube to the respective collar of the other header of the heat exchanger to form the bond for each tube and sealing each bond with a sealant material to form the seal. In yet another aspect, the melt-bonding comprises melt-bonding each tube to the respective collar of one header of the heat exchanger to form the bond and, simultaneously, sealing the bond with the sealant material to form the seal and melt-bonding each tube to the respective collar of the other header of the heat exchanger to form the bond and, simultaneously, sealing the bond with the sealant material to form the seal.

The novel features of the present invention will become apparent to those of skill in the art upon examination of the following detailed description of the invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

Certain embodiments of the present invention will now be described more fully with reference to the accompanying drawings, wherein like numerals denote like parts In the drawings.

DETAILED DESCRIPTION OF THE INVENTION

The present invention relates to a heat exchanger and a method for substantially sealing heat exchanger tubes using a technique that provides melt-bonding and sealing of the tubes to inhibit leakage. Such a method covers a high surface area in a short period of time and therefore, several tubes may be sealed at a reasonable rate compared to conventional methods, thus, the volume of manufacture can be increased. The method of the present invention increases not only the speed but the reproducibility such that a sufficient seal is obtained.

In one embodiment, the method for substantially sealing heat exchanger tubes comprises melt-bonding to form a suitable bond and coating the bond with a suitable sealant material to form a suitable seal. In a further embodiment, the method comprises application of a suitable sealant material, followed by melt-bonding to form a suitable bond and seal. In still a further embodiment, the method comprises melt-bonding the tube to form a suitable bond and, simultaneously, sealing the bond with a sealant material to form a suitable seal.

Figure 1:
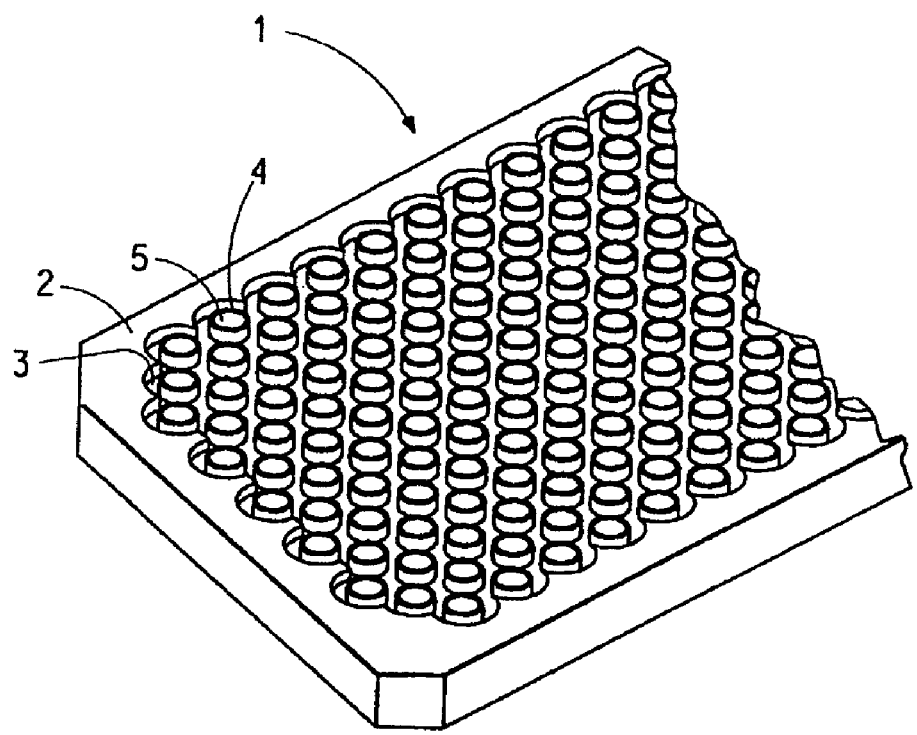
FIG. 1 shows a partial perspective view of an embodiment of a header with collar and tube end pairs of a heat exchanger.
Figure 2:
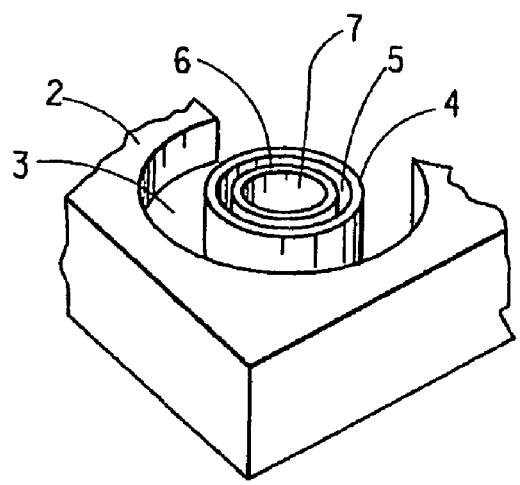
FIG. 2 is an enlargement of a portion of FIG. 1, showing a collar, but also with a tube sticking through the collar.
Figure 3:
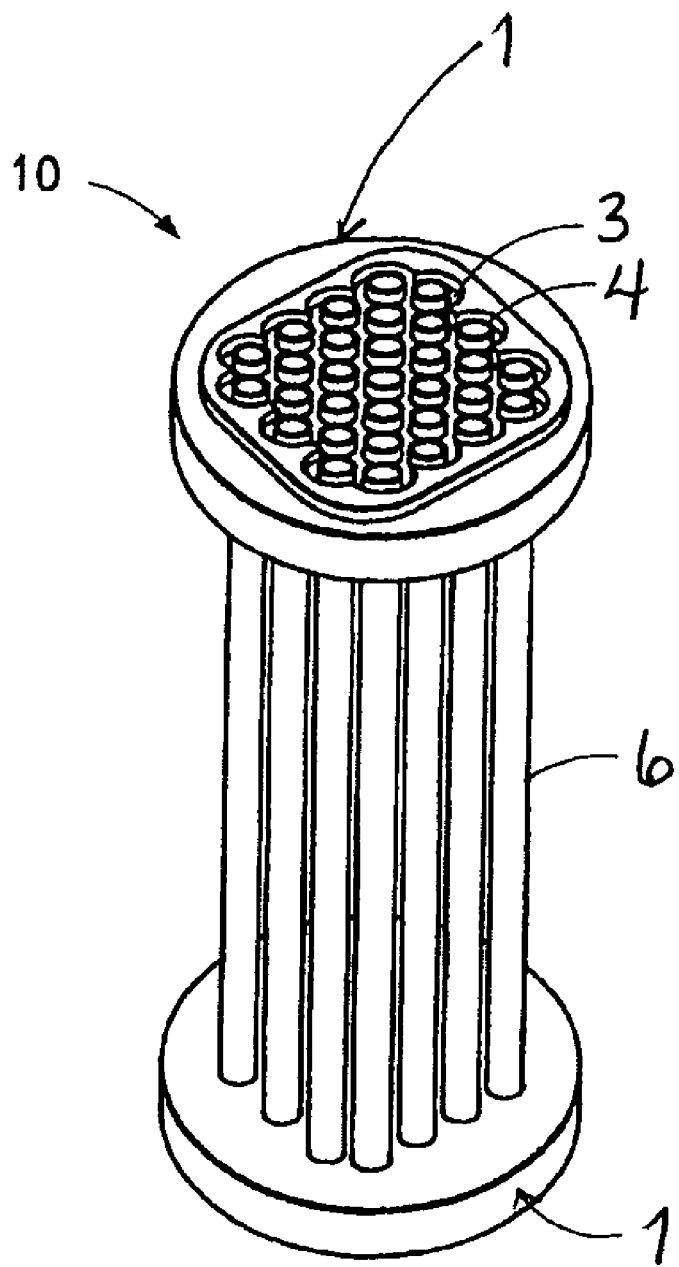
FIG. 3 shows a perspective view of an embodiment of a heat exchanger made according to an embodiment of the invention.

An embodiment of the heat exchanger is shown in FIGS. 1 to 3 and indicated generally by numeral 10 in FIG. 3. FIG. 1 shows a tube header 1 with a flat land 2. Material has been removed from the flat land 2, leaving a flat area 3, holes 5 and collars 4 extending away from the flat area 3. The configuration of the tube header 1 may be constructed using a variety of techniques, including numerically controlled machining or molding. FIG. 2 is an enlarged view of a portion of FIG. 1, showing the same elements, wherein a tube 6, having a hole 7, protruding through hole 5 in collar 4. FIG. 3 is an illustration of one way of putting together two headers 1, with collars 4 extending away from the flat area 3 and tubes 6 passing between headers 1 and through collars 4 in each of the headers 1. Using the method described herein to inhibit leakage, once the tubes 6 have been inserted through collars 4, the tubes 6 and their respective collars 4 can be melt-bonded together and sealed with a suitable sealant material using the method described herein. In a specific embodiment, the tubes 6 and their respective collars 4 are simultaneously, melt-bonded and sealed to form a suitable bond and seal.

Figure 4:
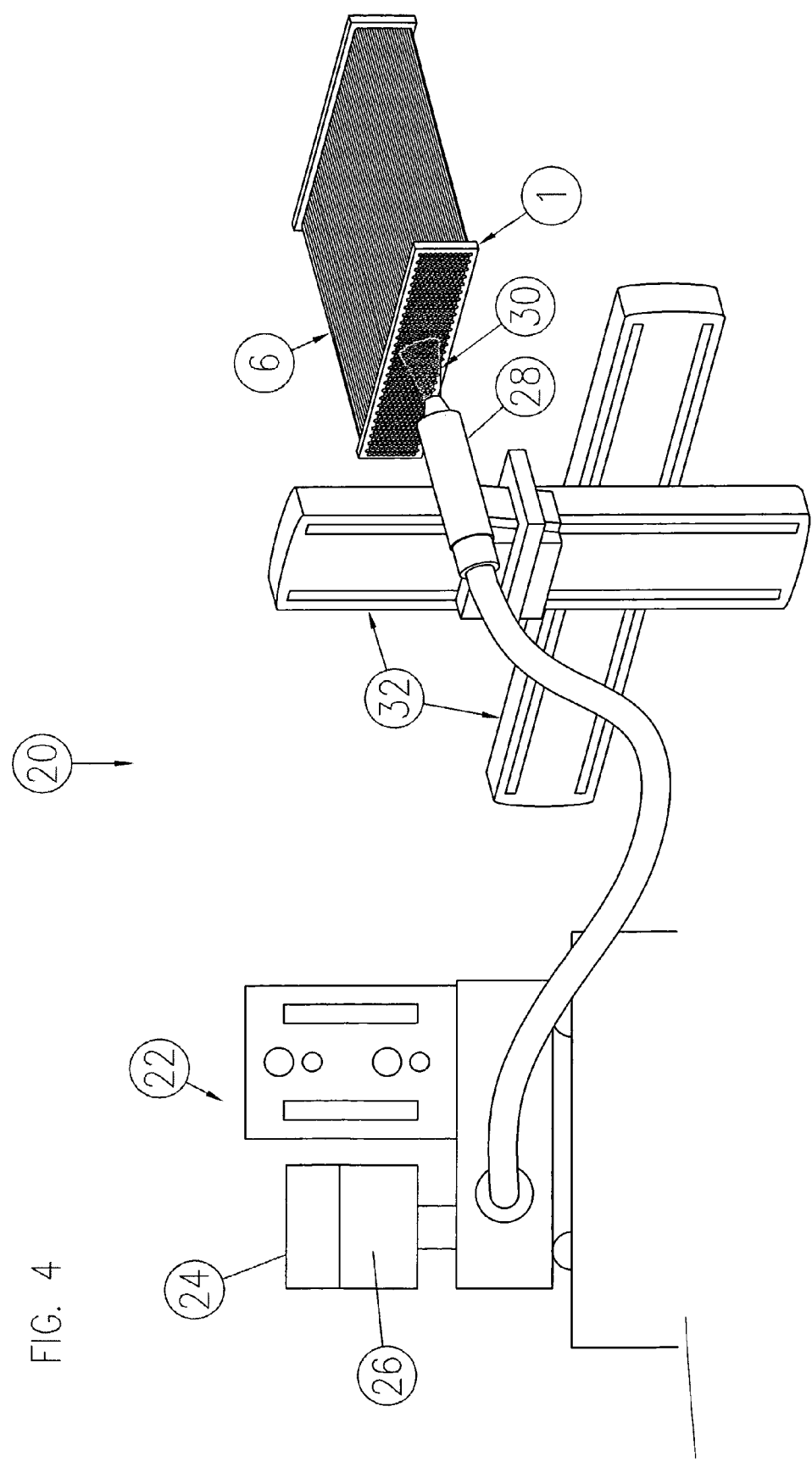
FIG. 4 is a perspective view of an embodiment of a flame spray deposition system according to an embodiment of the invention to permit sealing of a tube-collar pair.
Figure 5:
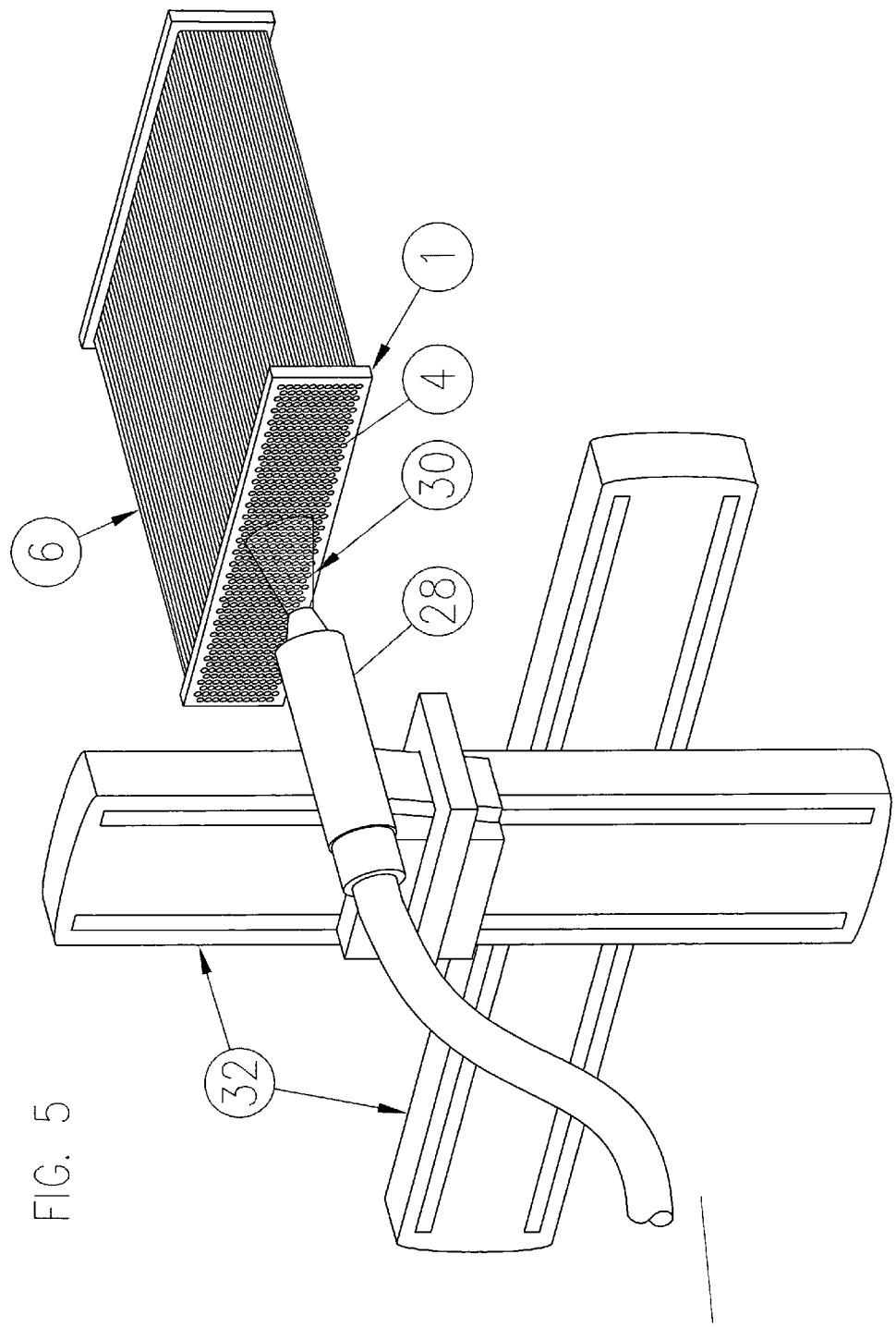
FIG. 5 is a perspective view of a portion of the flame spray deposition system of FIG. 4 showing, in operation, flame spray deposition for sealing a tube-collar pair.

With respect to the method for sealing the heat exchanger tubes, one embodiment is shown in FIGS. 4 and 5. In this embodiment, the method involves a flame spray deposition technique for, simultaneously, melt-bonding and sealing. In particular, the tubes 6 are melt-bonded to their respective collars 4 and, simultaneously, sealed with a suitable sealant material. FIG. 4 shows a perspective view of a flame spray deposition system 20 that has a flame sprayer 22. The flame sprayer 22 has a chamber 24 for receiving a suitable sealant material, in this particular embodiment, a polymer powder 26, which vibrates to maintain a homogeneous powder. Air is used to pump the powder 26 through a flame spray nozzle 28 to a hydrogen/oxygen flame 30 projecting from the flame spray nozzle 28. The flame spray nozzle 28 is attached to a guide 32, which permits the flame to be moved horizontally and vertically across the surface of the tube header 1, wherein the flame melt-bonds the tubes 6 to their respective collars 4 and, at the same time, the bond is substantially sealed with the polymer. In order for the bond to be substantially sealed, the flame 30 heats the polymer powder 26 to the melting point, atomizes the polymer powder 26, which is projected against the surface of the tube header 1 while the tubes 6 are melt-bonding to their respective collars 4. The tube header 1 receives about three passes of the flame 30, including the polymer.

In another embodiment of the method, the flame 30, which may or may not contain sealant material, is passed over the tube header 1 to melt-bond the tubes 6 to their respective collars 4 to form a suitable bond. A sealant material is then applied as a coating to the tube header 1 to coat the bond and provide an additional seal. The sealant material may be applied, for example, and without being limited thereto, by spray or immersion.

In an additional embodiment of the method, a sealant material is applied to the tube header 1, for example, and without being limited thereto, by spray or immersion. Then the flame 30, which may or may not contain sealant material, is passed over the tube header 1 to melt-bond the tubes 6 to their respective collars 4 to form a suitable bond and seal.

With respect to the embodiments described herein that utilize a flame, any suitable heat source may be used. For example, and without being limited thereto, the heat source may be a laser or an infrared source.

Although a flame spray deposition technique has been described with respect to certain above-identified embodiments, any suitable spray deposition technique may be used. For example, and without being limited thereto, a twin-wire arc spray deposition technique, a plasma spray deposition technique, a hydrogen flame spray deposition technique, a high velocity oxygen/fuel flame spray deposition technique, and/or a high velocity air/fuel flame deposition technique may be used. Such spray deposition technology is known to those skilled in the art. A combination of such techniques may also be used. One pass, for instance, may utilize a twin-wire arc spray deposition technique and another pass may utilize a hydrogen flame spray deposition technique. In conjunction with spray deposition techniques, an inert gas, such as argon and nitrogen, can be used to inhibit oxidation of, for example, the sealant material. For example, the spray deposition technique may be carried out in a chamber purged with an inert gas and/or the spray nozzle can be adapted to envelop the spray to inhibit oxidation. For instance, the spray nozzle can have a hole through which the spray is released and surrounding the hole is an annular ring through which the inert gas is released, enveloping the spray. With respect to a specific embodiment using a flame spray deposition technique, the flame spray nozzle can have a hole through which the flame is emitted and surrounding the hole is an annular ring through which the inert gas is released, enveloping the flame to inhibit oxidation.

The types of gases and the flow rates of the gases used, specifically, in the flame spray deposition technique are sufficient to create a suitable flame and to meter an amount of suitable sealant material to a substrate in order to provide a sufficient seal. Typically, oxygen, hydrogen, and/or hydrocarbon gases (e.g. propane) are used. When oxygen is chosen, there is substantially no heat degradation of the sealant material and the substrate (e.g. tube and header). Sealant material flow rates may be any suitable flow rate but may be typically from about 10 psi to about 30 psi, more typically, from about 15 psi to about 25 psi. The gas flow rates that make up the flame may be any suitable rate that produces a proper flame. Typical flow rates are from about 25 psi to about 50 psi, more typically, from about 25 psi to about 45 psi. The flame itself has a typical flow rate of about 35 psi to about 50 psi, more typically, about 45 psi to 50 psi. The temperatures of the flame are suitable to melt-bond, melt and atomize the sealant material.

The spray deposition techniques described herein may include one or more passes of the spray. Therefore, one or more passes of sealant material may be necessary depending on the seal required for the heat exchanger. Without being bound by theory, it is believed that the polymer impregnates and coats the bond formed by melt-bonding. Without being limited thereto, a coating thickness of from about 0.005 inches to about 0.007 inches is typical.

A suitable sealant material may be, and without being limited thereto, a polymer, ceramic, metal and/or metal alloy. The material used may be solid, semi-solid or liquid. Typically, it is in a powder form when used in spray deposition techniques. The semi-solid or solid may include a variety of average particle size ranges. Typically, the size of the particles of the sealant material is from about 100 microns to about sub-micron size.

More specifically, a suitable sealant material may be selected from polymers such as polyamides (e.g. Nylon), thermoplastics (e.g. isotropic thermoplastics (ITP), and/or liquid crystal polymers (LCP). Useful LCPs include those described in U.S. Pat. Nos. 3,991,013, 3,991,014 4,011,199, 4,048,148, 4,075,262, 4,083,829, 4,118,372, 4,122,070, 4,130,545, 4,153,779, 4,159,365, 4,161,470, 4,169,933, 4,184,996, 4,189,549, 4,219,461, 4,232,143, 4,232,144, 4,245,082, 4,256,624, 4,269,965, 4,272,625, 4,370,466, 4,383,105, 4,447,592, 4,522,974, 4,617,369, 4,664,972, 4,684,712, 4,727,129, 4,727,131, 4,728,714, 4,749,769, 4,762,907, 4,778,927, 4,816,555, 4,849,499, 4,851,496, 4,851,497, 4,857,626, 4,864,013, 4,868,278, 4,882,410, 4,923,947, 4,999,416, 5,015,721, 5,015,722, 5,025,082, 5,086,158, 5,102,935, 5,110,896, and 5,143,956, and European Patent Application 356,226; incorporated herein by reference. Useful thermotropic LCPs include polyesters, poly (ester-amides), poly (ester-imides), and polyazomethines. Some ITPs include: polyolefins such as polyethylene and polypropylene; polyesters such as poly(ethylene terephthalate, poly(butylene terephthalate), poly(ethylene-2,6-napthalate), and a polyester from 2,2-bis(4-hydroxyphenyl) propane and a combination of isophthalic and terephthalic acids; styrenics such as polystyrene and copolymers of styrene with (meth)acrylic esters; acrylonitrile-butadiene styrene thermoplastics; (meth)acrylic polymers including homo- and copolymers of the parent acids, and/or their esters and/or amides; polyacetals such as polymethylene oxide; fully and partially fluoropolymers such as polytetrafluoroethylene, polychlorotrifluoro-ethylene, poly(tetrafluoro-ethylene/hexafluoropropylene) copolymers, poly [tetrafluoroethylene/perfluoro (propyl vinyl ether)] copolymers, poly(vinylfluoride), poly (vinylidene fluoride), and poly(vinyl fluoride/ethylene)copolymers; ionomers such as an ionomer of an ethylene-acrylic acid copolymer; polycarbonates; poly (amide-imides); poly (ester-carbonates); poly(imide-ethers); polymethylpentene; linear polyolefins such as polypropylene; poly(etherketoneketone); polyimides; poly(phenylene sulfide); polymers of cyclic olefins; poly(vinylidene chloride); polysulfones; poly(ether-sulfones); and polyamides such as nylon-6,6 nylon-6, nylon-6,12, nylon-6,12, nylon 4,6, and the polyamides from terephthalic acid and/or isophthalic acid and 1,6-hexanediamine and/or 2-methyl -1,5-pentanediamine. Some particular polyamides are nylon-6,6, nylon-6, and a copolymer of terephthalic acid with 1,6-hexanediamine and 2-methyl-1,5-pentanediamine wherein 1,6-hexanediamine is about 30 to about 70 mole percent of the total diamine used to prepare the polymer and/or nylon-6,6, nylon-6 and a copolymer of terephthalic acid with 1,6-hexandiamine and 2-methyl-1,5-pentanediamine wherein 1,6-hexanediamine is about 50 mole percent of the total diamine used to prepare the polymer. Other suitable sealant materials have also been described in U.S. Pat. No. 4,935,462, the subject matter of which is herein incorporated by reference, more particularly, a homogeneous admixture of benzyl alcohol, phenol and polyamides.

The polymers may contain other materials conventionally found in polymers, such as fillers, reinforcing agents, antioxidants, antiozonants, dyes, pigments, etc.

The ceramics may be any suitable metal oxide or precursor thereof that may be capable of acting as a sealant material. For example, and without being limited thereto, alumina or silicon carbide may be suitable ceramics.

The metals and/or alloys may be any suitable metal and/or alloy capable of acting as a sealant material. Some suitable metals are aluminum, copper, titanium, tantalum and/or tungsten. Some suitable alloys are silica and/or silicon nitride.

The method may be applied to a variety of heat exchangers in order to sufficiently seal the tube(s) to a certain surface. As long as the tube is capable of being melt-bonded to the surface, the method may be applied to any such heat exchanger.

The heat exchangers may be made of any suitable material and may be of any suitable shape. Although the tubes of the described embodiments are cylindrical in shape, it is understood that a variety of shapes may be utilized. For example, the tubes may be hexagonal, triangular, etc. Tubes can therefore be understood to broadly encompass any open-ended hollow member. The tube composition may be made from any suitable material, depending on the application of the heat exchanger. Such materials include the polymers, ceramic, metal and/or metal alloy, as described above with respect to the sealant material.

With respect to the headers, any suitable header may be used such that the tubes may be able to melt-bond with the header and still permit fluid to flow therethrough. For example, and without being limited thereto, it is not necessary that the header have a collar. The header may include simple holes for receiving the tube ends, whereby once the method has been applied, the tube end may melt-bond to the wall that defines the hole in the header, and the bond substantially sealed with sealant material. The header may be made from any suitable material, depending on the application of the heat exchanger. Such materials include the polymers, ceramic, metal and/or metal alloy, as described above with respect to the sealant material.

When introducing elements disclosed herein, the articles "a", "an", "the", and "said" are intended to mean that there are one or more of the elements. The terms "comprising", "having", "including" are intended to be open-ended and mean that there may be additional elements other than the listed elements.

The above disclosure generally describes the present invention. A more complete understanding can be obtained by reference to the following specific Example. The Example is described solely for purposes of illustration and is not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLE

Using the flame deposition system 20 of FIG. 4, the flame sprayer 22 was a PG-550 Alamo Supply Co. No. 297, which had Rilsan™ 2117 Bluemac ES Nylon powder in the chamber 24. Air is used to pump the Nylon powder through the flame spray nozzle 28 to the hydrogen/oxygen flame 30 projecting from the nozzle 28. The powder flow was about 15 psi to about 25 psi, the hydrogen flow was about 25 psi and the oxygen flow was about 45 psi. The flame 30 of the flame spray nozzle 28 had a flow of about 48 psi. The flame 30 heats the Nylon powder to the melting point, atomizes the Nylon powder, which was projected against the surface of the tube header 1. The flame spray nozzle 28 was attached to the guide 32, which moved horizontally and vertically across the surface of the tube header 1 at a velocity of about 200 inches/minute to melt-bond the tubes 6 to their respective collars 4 to form a bond and, simultaneously, seal the bond with the Nylon to form a seal. The tube header received three passes of the flame 30, including the Nylon.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The invention claimed is:

1. A method for substantially sealing a heat exchanger tube to a header of the heat exchanger, the method comprising melt-bonding the tube directly to a header of the heat exchanger to form a direct bond between the tube and the header and sealing the bond by depositing a sealant material to form a seal, wherein said melt-bonding the tube directly to the header of the heat exchanger to form the direct bond between the tube and the header and said depositing of the sealant material to form the seal is done simultaneously.

2. The method of claim 1, wherein said depositing comprises a spray depositing technique that is used to melt-bond the tube directly to the header of the heat exchanger and, simultaneously, seal the bond with the sealant material.

3. The method of claim 2, wherein said spray depositing is selected from at least one of flame spray depositing, twin-wire arc spray depositing, plasma spray depositing, high velocity oxygen/fuel flame spray depositing, and high velocity air/fuel flame spray depositing.

4. The method of claim 3, wherein the spray depositing is said flame spray depositing.

5. The method of claim 4, wherein the flame spray depositing comprises directing a flame to a surface of the header, the flame having atomized sealant material therein.

6. The method of claim 5, wherein the flame is capable of moving across the surface of the header.

7. The method of claim 6, wherein the flame is capable of making one or more passes across the surface of the header, depending on the seal desired.

8. The method of claim 6, wherein the flame is capable of moving across the surface of the header at a velocity of 200 inches/minute.

9. The method of claim 1, further comprising using an inert gas to inhibit oxidation of the sealant material.

10. The method of claim 1, wherein the tube is a plurality of tubes.

11. The method of claim 1, wherein the header comprises a collar, the tube being inserted through the collar.

12. The method of claim 11, wherein said melt-bonding the tube to the header comprises melt-bonding the tube to the collar of the header.

13. The method of claim 1, wherein the sealant material comprises a polymer, ceramic, metal and/or metal alloy.

14. The method of claim 1, wherein the tube and header are thermoplastic materials.

15. The method of claim 14 wherein the thermoplastic materials are polyamides.

16. A heat exchanger comprising a heat exchanger tube that has been substantially sealed to a header of the heat exchanger using the method of claim 1.

17. The method of claim 1, wherein the seal includes a continuous seal formed across the header.

18. A method for substantially sealing a heat exchanger, the heat exchanger comprising a plurality of tubes and a pair of headers, each header having a plurality of holes, an outer side and an inner side, the inner side of one header facing the inner side of the other header, one end of each tube placed in a respective hole in one header and the other end of each tube placed in a respective hole in the other header, the method comprising melt-bonding one end of each tube directly to one header of the heat exchanger to form a direct bond between each tube and the header and sealing each bond by depositing a sealant material to form a seal, wherein said melt-bonding one end of each tube directly to one header of the heat exchanger to form the direct bond between each tube and the header and said depositing of the sealant material to form the seal is done simultaneously.

19. The method of claim 18, wherein the seal includes a continuous seal formed across the headers.

20. The method of claim 18, wherein each header comprises a collar surrounding each hole.

21. The method of claim 20, wherein said melt-bonding each tube directly to one header comprises melt-bonding each tube directly to each collar of the header.

22. A method for substantially sealing a heat exchanger tube to a header of the heat exchanger, the method comprising:

generating a stream of heated fluid, the heated fluid having a temperature sufficient to melt portions of the heat exchanger tube and the header;

projecting the heated fluid stream toward the heat exchanger tube and the header such that at least a portion of the heated fluid stream impinges on an interface between the heat exchanger tube and the header;

applying heat to an interface between the heat exchanger tube and the header;

introducing a sealant to the heated fluid stream so that the sealant is applied to the interface during the application of heat to the interface; and melting the sealant and portions of the heat exchanger tube and the header to bond the heat exchanger tube and the header to each other at the interface and to seal the bond formed at the interface.

23. The method of claim 22 wherein the sealant is introduced to the heated fluid stream as a polymer powder.

24. The method of claim 23 wherein applying heat to the interface comprises generating a flame that is presented to a vicinity of the interface, and further comprising generating an air stream containing the polymer powder and directing the air stream to the vicinity of the interface.

* * * * *